(12) United States Patent
Sauerwald

(10) Patent No.: US 6,783,311 B2
(45) Date of Patent: Aug. 31, 2004

(54) TIE-DOWN CABLE FOR VEHICLE BEDS

(76) Inventor: Kevin S. Sauerwald, 721 Cressman Rd., Harleysville, PA (US) 19438

( * ) Notice: Subject to any disclaimer, the term of this patent is extended or adjusted under 35 U.S.C. 154(b) by 0 days.

(21) Appl. No.: 10/273,554

(22) Filed: Oct. 19, 2002

(65) Prior Publication Data

US 2004/0076487 A1 Apr. 22, 2004

(51) Int. Cl.$^7$ ................................................. B60P 7/08
(52) U.S. Cl. ........................ 410/97; 410/116; 410/118
(58) Field of Search ........................... 410/96, 97, 100, 410/106, 110, 116, 118; 248/499

(56) References Cited

U.S. PATENT DOCUMENTS

| | | | | |
|---|---|---|---|---|
| 4,096,807 A | * | 6/1978 | Woodward | 410/118 |
| 4,850,769 A | * | 7/1989 | Matthews | 410/105 |
| 5,452,973 A | * | 9/1995 | Arvin | 410/118 |
| 5,800,106 A | * | 9/1998 | Miller | 410/117 |
| 5,876,167 A | * | 3/1999 | Selby | 410/97 |
| 5,915,900 A | * | 6/1999 | Boltz | 410/110 |
| 6,017,174 A | * | 1/2000 | Ross et al. | 410/100 |
| 6,039,521 A | * | 3/2000 | Sullivan | 410/118 |
| 6,152,664 A | * | 11/2000 | Dew et al. | 410/100 |
| 2001/0046424 A1 | * | 11/2001 | McDonald | 410/97 |
| 2002/0006317 A1 | * | 1/2002 | Hofmann et al. | 410/96 |

* cited by examiner

*Primary Examiner*—Stephen Gordon

(57) ABSTRACT

A tie-down cable assembly attaches to a vehicle bed and improves how cargo can be secured in the vehicle bed. The assembly includes a first tie-down cable longitudinally spanning the vehicle bed and having two opposing ends. A first fastener is connected to a first of the ends of the first cable and to the front bed tie-down anchor of the first pair. A second fastener is connected to a second of the ends of the first cable and to the rear bed tie-down anchor of the first pair. A second tie-down cable longitudinally spans the vehicle bed and having two opposing ends. A first fastener is connected to a first of the ends of the second cable and to the front bed tie-down anchor of the second pair. A second fastener is connected to a second of the ends of the second cable and to the rear bed tie-down anchor of the second pair. A chord is connected to the first cable to the second cable. The chord covers and secures the cargo that is to be held.

13 Claims, 4 Drawing Sheets

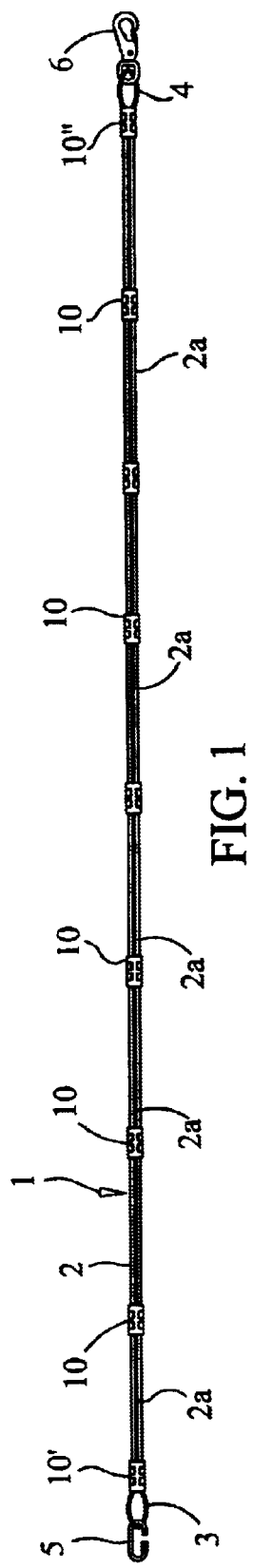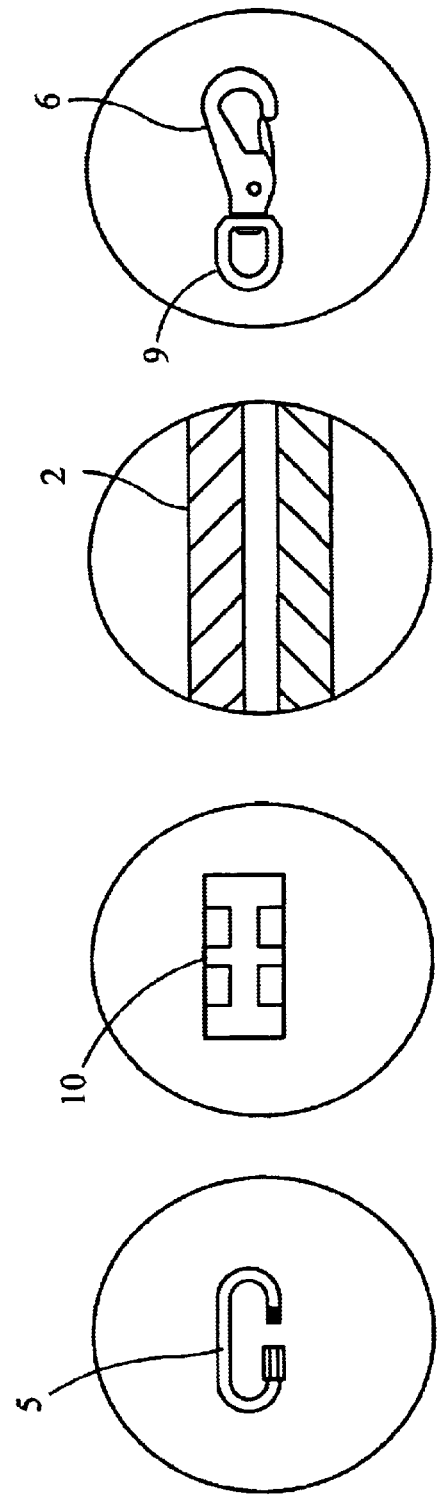

TIE-DOWN CABLE FOR VEHICLE BEDS

BACKGROUND OF THE INVENTION

1. Field of the Invention

The invention relates to devices for securing cargo in beds of vehicles and, in particular, to cables attaching to pickup-truck tie-down anchors that improve connection of bungee chords and cargo nets.

2. Description of the Related Art

Vehicles such as pickup trucks and station wagons are designed for carrying cargo. If the cargo moves during transport, the cargo and/or the vehicle can become damaged.

To prevent shifting, vehicle manufacturers provide tie-down anchors in the cargo space (i.e. the pickup-truck bed) for attaching bungee chords and cargo nets directly to them. Generally, the number of tie-down anchors is limited and does not allow for proper and complete securing of items. In particular, smaller items that do not fill the cargo space may be impossible to secure when using bungee chords attached directly to the tie-down anchors.

SUMMARY OF THE INVENTION

It is accordingly an object of the invention to provide tie-down cable for vehicle beds that overcomes the above-mentioned disadvantages of the heretofore-known devices and methods of this general type and that allows for chords to span the vehicle bed and limits the movement of the chords so as to better secure the cargo.

With the foregoing and other objects in view there is provided, in accordance with the invention, a tie-down cable for a vehicle bed, the vehicle bed having a front and a rear tie-down anchor. The assembly includes a cable longitudinally spanning the vehicle bed. The cable has two opposing ends. A first fastener is connected to a first of the ends and to the front bed tie-down anchor. A second fastener is connected to a second of the ends and to the rear bed tie-down anchor. Accordingly, the tie-down cables provide additional locations for anchoring chords. By providing additional locations, the cargo can be secured better.

In accordance with a further object of the invention, the cable is a loop. A ferrule can be added that spans the loop to divide it into subloops. The subloops allow for cords to be attached thereto and also limit over how much of the length the chords can travel. This prevent chords from moving too far and falling off the cargo.

In accordance with a further object of the invention, the fasteners can be a quick link, a swivel eye snap, or other suitable fastener. In the case of a swivel eye snap, the cable threads through the eye. The fasteners should be secured to the vehicle but able to detach when desired.

In accordance with a further object of the invention, the tie-down cable assembly the fasteners are fixed permanently to the cable.

In accordance with a further object of the invention, the fasteners can releasably fix the cable to one of the tie-down anchors of the vehicle.

In accordance with a further object of the invention, the tie-down cable assembly includes a ferrule being disposed near one of said ends of the cable and spanning the loop. For purposes of this feature of the invention, the term "near" means close enough to restrict movement of the cable about the fastener but not to tight as to make connection of the fastener impossible.

In accordance with a further object of the invention, the cable is steel cable. While other materials are possible, steel cables are both strong and economical. By coating the steel cable with a resin, the steel cable will not scratch the finish of the vehicle.

In accordance with a further object of the invention, a tie-down cable assembly connects to a vehicle bed having two pairs of a front and a rear tie-down anchor and can secure the cargo. The assembly includes a first cable and second cable as described above. A chord interconnects the first cable and the second cable. The chord secures cargo in the bed of the vehicle. To aid in securing cargo, the chord can be a bungee chord or a net.

In accordance with a further object of the invention, the first and said second cables are each loops. A respective ferrule for each of said cables connects to said respective cable, spans the loop of the respective cables, and forms subloops therein. In this configuration, the chord connects to at least one subloop of each of the cables. This limits the position of the chord on the cable to one of the subloops. By limiting the movement of the cable, the cargo can be better secured.

In accordance with a further object of the invention, the subloops of the first cable are paired with subloops of the second cable and a chord connects each pair of subloops.

Other features which are considered as characteristic for the invention are set forth in the appended claims.

Although the invention is illustrated and described herein as embodied in tie-down cable for pick-up truck bed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a plan view of a tie-down cable assembly;

FIG. 2 is an enlarged view of the quick link shown in FIG. 1;

FIG. 3 is an enlarged view of the ferrule shown in FIG. 1;

FIG. 4 is an enlarged view of the coated steel cable shown in FIG. 1;

FIG. 5 is an enlarged view of the swivel eye snap shown in FIG. 1;

DESCRIPTION OF PREFERRED EMBODIMENTS

Figure 6:
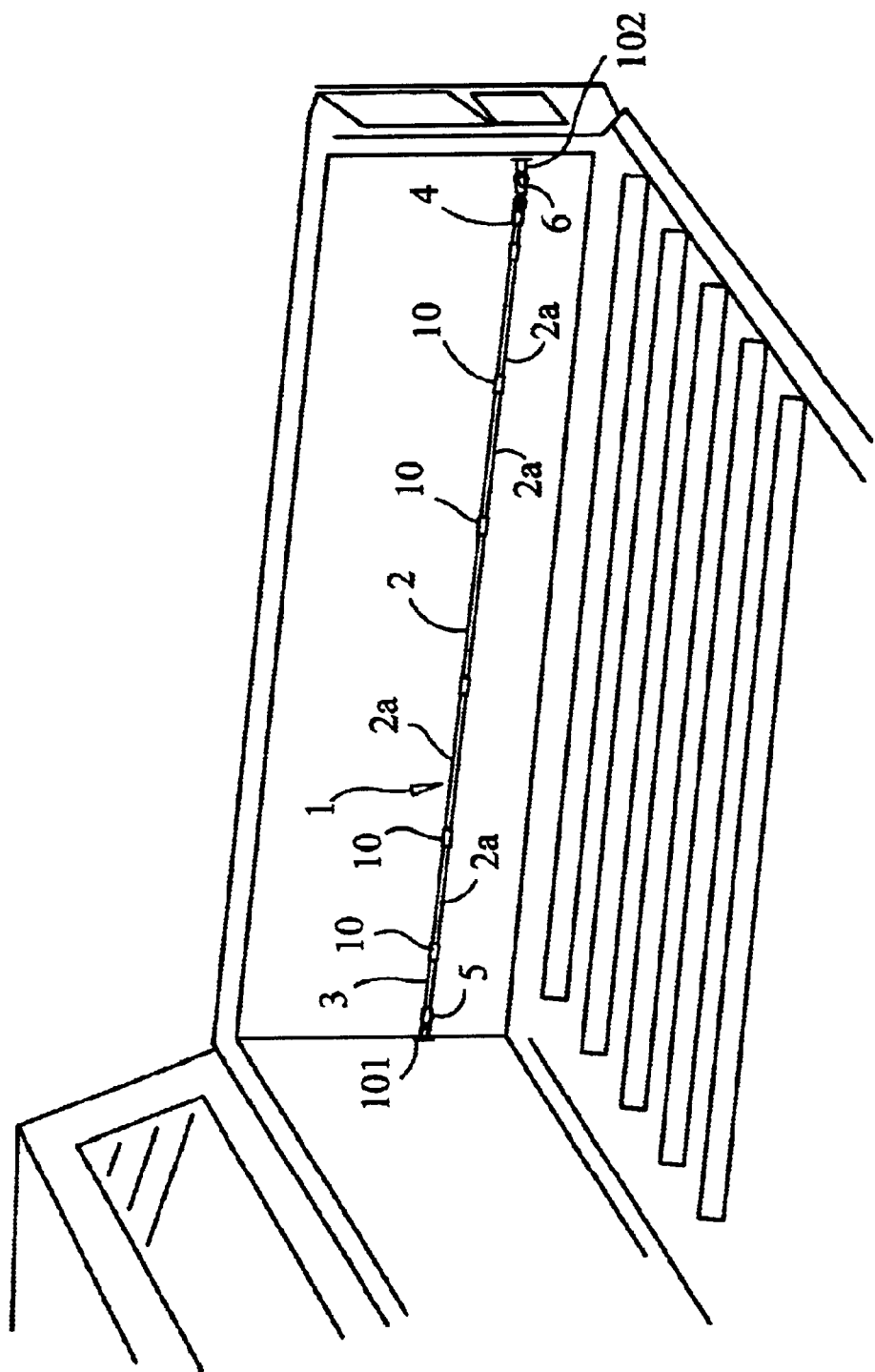
FIG. 6 is a partial left-side perspective view of pickup truck bed having a tie-down cable assembly attached thereto.

Referring now to the figures of the drawing in detail and first, particularly, to FIG. 1 thereof, there is seen a tie-down cable for pick-up truck bed generally marked by reference number 1. A cable 2 is formed into a loop. The cable has two ends 3 and 4. The cable 2 is preferably a three thirty-secondths of an inch (3/32") thick, coated steel cable (see FIG. 4). A first fastener 5 is not permanently connected to the first end 3 of the cable. Preferably, the first fastener 5 is quick connect (see FIG. 2). A second fastener 6 is permanently connected to the second end 4 of the cable. Preferably, the second fastener 6 is a swivel, eye snap (see FIG. 5). The swivel eye snap 6 has an eye 9 through which the cable 2 is threaded. A plurality of ferrules 10 (See FIG. 3) connect to the cable 2 and span the loop to form sub loops 2a. Preferably, ferrules 10' and 10" are placed respectively near each end 3 and 4 of the cable 2.

FIG. 6 generally shows a pickup-truck bed 100. A front tie-down anchor 101 is built into the pickup-truck bed 100. Likewise, a rear tie-down anchor 102 is also built into the pickup-truck bed 100.

Figure 7:
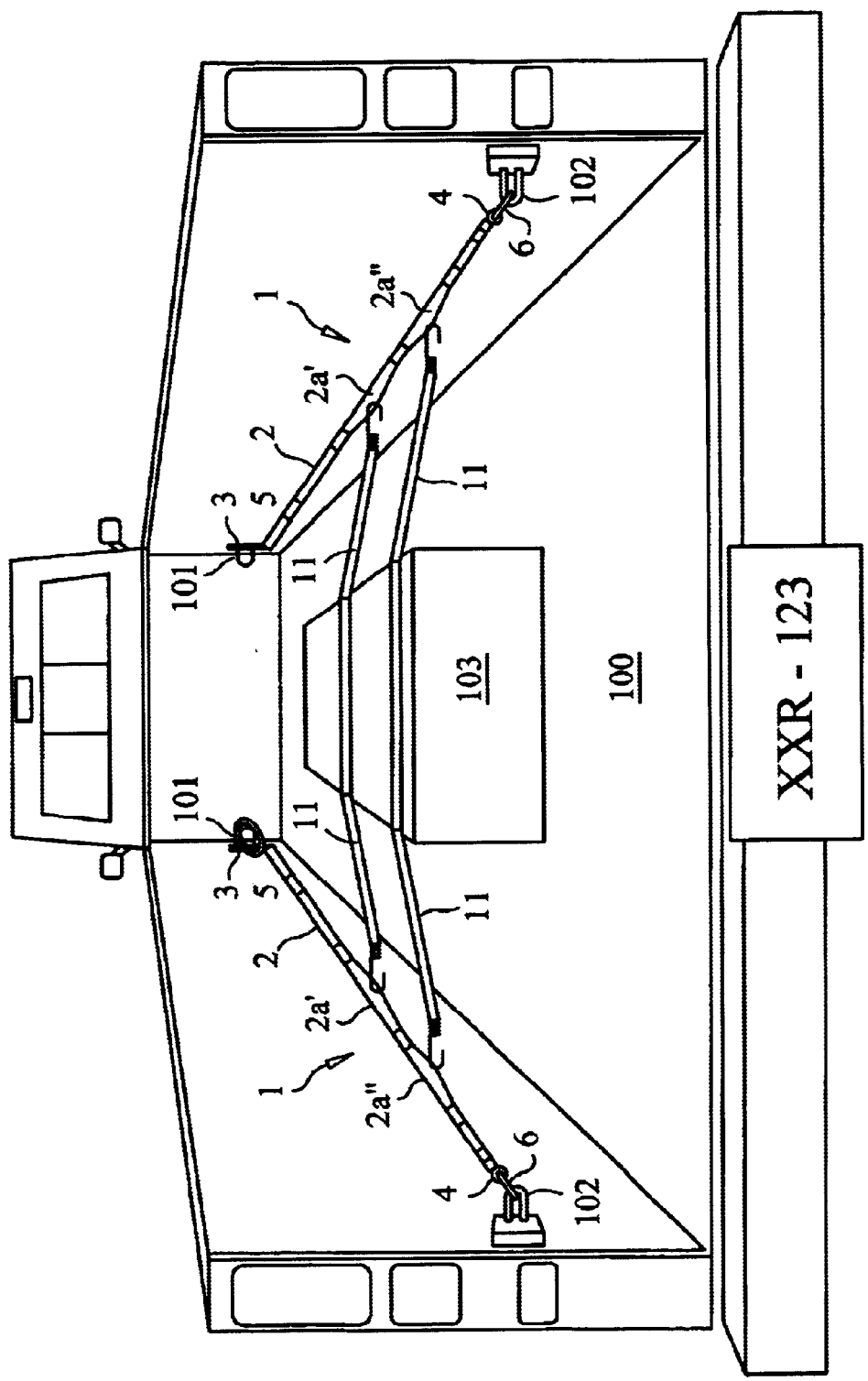
FIG. 7 is a rear elevational view of a pickup truck bed having a tie-down cable assembly attached thereto having a chord for each subloop.

FIG. 7 is an elevational view of a tie-down cable assembly 1 including two cables 2 connected by chords 11 connected to a pick-up truck bed 100. The chords 11 are bungee chords ending in hooks that attach to subloops 2a. The subloops occur in pairs, i.e. 2a' and 2a". Each pair 2a ' and 2a" has a respective chord 11 interconnecting them. The chords 11 secure the cargo 103 in the pickup-truck bed 100. Because each cable 2 is subdivided into subloops 2a, chords 11 can only move over the course of their respective subloops 2a. This prevents the chords from moving too far and falling off the cargo 103.

Figure 8:
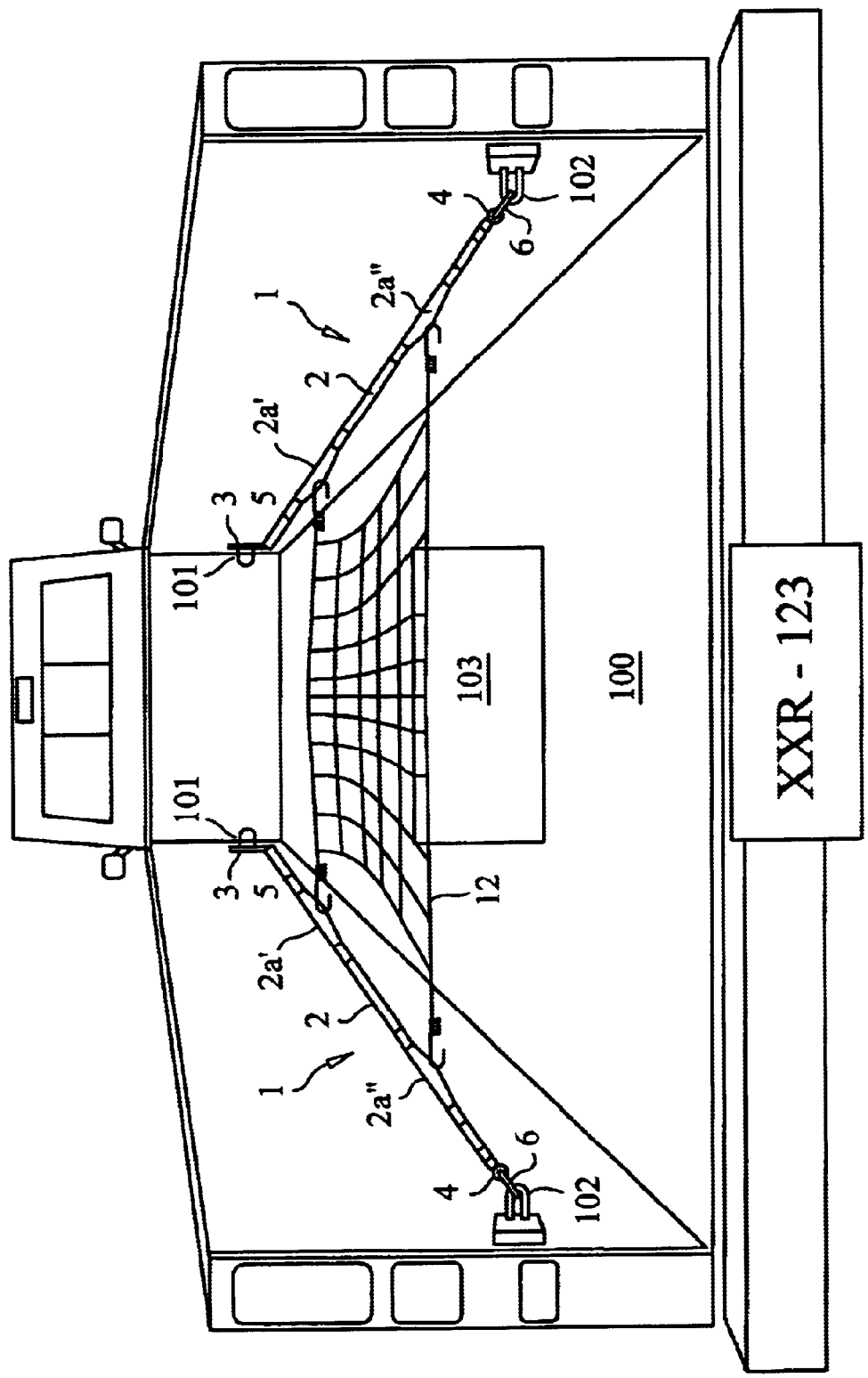
FIG. 8 is a rear elevational view of a pickup-truck bed having a tie-down cable assembly attached thereto having a net.

FIG. 8 shows an embodiment of the tie-down cable assembly 1 wherein the chords take the form of a net 12. The net 12 secures the cargo 103 in the pickup-truck bed 100.

I claim:

1. A tie-down cable for a vehicle bed having a front and a rear tie-down anchor, comprising:
    a cable formed as a loop longitudinally spanning the vehicle bed and having two opposing ends;
    a first fastener being connected to a first of said ends and to the front bed tie-down anchor; and
    a second fastener being connected to a second of said ends and to the rear bed tie-down anchor.

2. The tie-down cable according to claim 1, including a ferrule spanning the loop to form subloops.

3. The tie-down cable according to claim 1, wherein at least one of said fasteners is a quick link.

4. A tie-down cable for a vehicle bed having a front and a rear tie-down anchor, comprising:
    a cable longitudinally spanning the vehicle bed and having two opposing ends;
    a first fastener being connected to a first of said ends and to the front bed tie-down anchor; and
    a second fastener being connected to a second of said ends and to the rear bed tie-down anchor;
    at least one of said fasteners being a swivel eye snap having an eye; and
    said cable being threaded through said eye.

5. The tie-down cable according to claim 1, wherein at least one of said fasteners is fixed permanently to said cable.

6. The tie-down cable according to claim 1, wherein at least one of said fasteners is for releasably fixing said cable to one of the tie-down anchors.

7. The tie-down cable according to claim 1, including a ferrule being disposed near one of said ends of said cable and spanning said loop.

8. The tie-down cable according to claim 1, wherein said cable is steel cable.

9. A tie-down cable assembly for a vehicle bed having two pairs of a front and a rear tie-down anchor, comprising:
    a first cable formed as a loop longitudinally spanning the vehicle bed and having two opposing ends; a first fastener being connected to a first of said ends of said first cable and to the front bed tie-down anchor of the first pair; and a second fastener being connected to a second of said ends of said first cable and to the rear bed tie-down anchor of the first pair;
    a second cable formed as a loop longitudinally spanning the vehicle bed and having two opposing ends; a first fastener being connected to a first of said ends of said second cable and to the front bed tie-down anchor of the second pair; and a second fastener being connected to a second of said ends of said second cable and to the rear bed tie-down anchor of the second pair; and
    a chord being connected to the first cable to the second cable.

10. A tie-down cable assembly for a vehicle bed having two pairs of a front and a rear tie-down anchor, comprising:
    a first cable longitudinally spanning the vehicle bed and having two opposing ends; a first fastener being connected to a first of said ends of said first cable and to the front bed tie-down anchor of the first pair; and a second fastener being connected to a second of said ends of said first cable and to the rear bed tie-down anchor of the first pair;
    a second cable longitudinally spanning the vehicle bed and having two opposing ends; a first fastener being connected to a first of said ends of said second cable and to the front bed tie-down anchor of the second pair; and a second fastener being connected to a second of said ends of said second cable and to the rear bed tie-down anchor of the second pair; and
    a bungee chord being connected to the first cable and to the second cable.

11. The tie-down cable assembly according to claim 9, wherein said chord is a net.

12. A tie-down cable assembly for a vehicle bed having two pairs of a front and a rear tie-down anchor, comprising:
    a first cable formed as a loop, longitudinally spanning the vehicle bed, and having two opposing ends; a first fastener being connected to a first of said ends of said first cable and to the front bed tie-down anchor of the first pair; and a second fastener being connected to a second of said ends of said first cable and to the rear bed tie-down anchor of the first pair;
    a second cable formed as a loop, longitudinally spanning the vehicle bed, and having two opposing ends; a first fastener being connected to a first of said ends of said second cable and to the front bed tie-down anchor of the second pair; and a second fastener being connected to a second of said ends of said second cable and to the rear bed tie-down anchor of the second pair;
    a chord interconnecting said first cable and said second cable;
    a first ferrule connected to and spanning said loop of said first cable to form subloops of said first cable; and
    a second ferrule connected to and spanning said loop of said second cable to form subloops of said second cable;
    said chord being connected to at least one of said subloops of each of said cables.

13. The tie-down cable assembly according to claim 12, wherein said subloops of said first and said second cables are paired to define a first and a second pair of subloops; and said chord connects said first pair of said subloops of said cables; and a further chord connects said second pair of said subloops of said cables.

* * * * *